US012508826B2

(12) United States Patent
Adachi et al.

(10) Patent No.: US 12,508,826 B2
(45) Date of Patent: Dec. 30, 2025

(54) MEDIUM PROCESSING APPARATUS, RECORDING SYSTEM, METHOD OF CONTROLLING MEDIUM PROCESSING APPARATUS

(71) Applicant: SEIKO EPSON CORPORATION, Tokyo (JP)

(72) Inventors: Hirohisa Adachi, Matsukawa-machi (JP); Takeru Oguchi, Chino (JP); Kazuyoshi Ohashi, Matsumoto (JP); Masaki Miyazawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 174 days.

(21) Appl. No.: 18/518,495

(22) Filed: Nov. 23, 2023

(65) Prior Publication Data

US 2024/0174008 A1 May 30, 2024

(30) Foreign Application Priority Data

Nov. 25, 2022 (JP) ................................ 2022-188416

(51) Int. Cl.

| | |
|---|---|
| ***B41J 13/02*** | (2006.01) |
| ***B41J 13/00*** | (2006.01) |
| ***B41J 13/03*** | (2006.01) |
| *B41J 11/00* | (2006.01) |
| *B41J 29/393* | (2006.01) |
| *B42B 5/00* | (2006.01) |
| *B42C 19/08* | (2006.01) |

(Continued)

(52) U.S. Cl.
CPC ........... *B41J 13/025* (2013.01); *B41J 13/009* (2013.01); *B41J 13/03* (2013.01); *B41J 11/00* (2013.01); *B41J 29/393* (2013.01); *B42B 5/00* (2013.01); *B42C 19/08* (2013.01); *B65H 29/20* (2013.01); *B65H 29/52* (2013.01)

(58) Field of Classification Search
CPC ........ B41J 13/025; B41J 13/009; B41J 13/03; B41J 11/00; B41J 29/393; B65H 29/20; B65H 29/52; B42B 5/00; B42C 19/08
See application file for complete search history.

(56) References Cited

U.S. PATENT DOCUMENTS

| | | | | |
|---|---|---|---|---|
| 2018/0237255 A1* | 8/2018 | Yamamoto | ......... | G03G 15/6529 |
| 2020/0102174 A1 | 4/2020 | Uchibori | | |
| 2023/0241859 A1* | 8/2023 | Saito | ................. | H04N 1/00639 270/1.01 |

FOREIGN PATENT DOCUMENTS

| | | |
|---|---|---|
| JP | 2007076862 | 3/2007 |
| JP | 2007204232 A | 8/2007 |
| JP | 2020050502 A | 4/2020 |

* cited by examiner

*Primary Examiner* — Henok D Legesse
(74) *Attorney, Agent, or Firm* — CHIP LAW GROUP

(57) ABSTRACT

A medium processing apparatus includes a feeding portion configured to transport a medium, a processing tray on which the medium transported by the feeding portion is placeable, a processing portion configured to process the medium on the processing tray, and a discharging portion configured to discharge the medium placed on the processing tray, wherein a first mode in which the medium transported by the feeding portion is placed on the processing tray and then discharged by the discharging portion, and a second mode in which the medium transported by the feeding portion is discharged by the discharging portion without being placed on the processing tray are switchable.

16 Claims, 11 Drawing Sheets

(51) Int. Cl.
*B65H 29/20* (2006.01)
*B65H 29/52* (2006.01)

MEDIUM PROCESSING APPARATUS, RECORDING SYSTEM, METHOD OF CONTROLLING MEDIUM PROCESSING APPARATUS

The present application is based on, and claims priority from JP Application Serial Number 2022-188416, filed Nov. 25, 2022, the disclosure of which is hereby incorporated by reference herein in its entirety.

BACKGROUND

1. Technical Field

The present disclosure relates to a medium processing apparatus that performs processing on a medium. In addition, the present disclosure relates to a recording system provided with the medium processing apparatus. In addition, the present disclosure relates to a method of controlling a medium processing apparatus.

2. Related Art

A medium processing apparatus has been known in related art that performs processing, such as staple processing or punching processing on a medium such as a sheet, and an example thereof is disclosed in JP 2020-50502 A. The medium processing apparatus described in JP 2020-50502 A includes a medium tray on which a medium discharged by a discharging portion is placed, a guide member configured to come into contact with the medium discharged by the discharging portion from above and guide the medium to the medium tray, a width-direction aligning member configured to align an end portion in a width direction of the medium discharged to the medium tray, and an upstream-end aligning member configured to align an upstream end, that is, a rear end of the medium.

The rear end of the medium fed to the medium tray by the discharging portion is caused to abut against the upstream-end aligning member by a paddle, whereby the medium is aligned in a transport direction. Further, the medium fed to the medium tray is aligned in the width direction by the width-direction aligning member.

After being processed by a processing portion, the medium placed on the medium tray is nipped by a lower roller and an upper roller provided downstream of the medium tray and is discharged. The upper roller is provided so as to be capable of advancing and retracting with respect to the lower roller.

There is a user's need to discharge the medium as is without performing the processing by the processing portion even in the configuration in which the processing portion that performs processing on the medium is included as in the medium processing apparatus described in JP 2020-50502 A, and it is desired to respond to such a user's need.

SUMMARY

A medium processing apparatus of the present disclosure for solving the above-described problems includes a feeding portion configured to transport a medium, a processing tray on which the medium transported by the feeding portion is placeable, a processing portion configured to process the medium on the processing tray, and a discharging portion configured to discharge the medium placed on the processing tray, wherein a first mode in which the medium transported by the feeding portion is placed on the processing tray and then discharged by the discharging portion, and a second mode in which the medium transported by the feeding portion is discharged by the discharging portion without being placed on the processing tray are switchable.

Additionally, a medium processing apparatus of the present disclosure includes a processing portion configured to perform processing on a medium, a processing tray on which the medium subjected to the processing is placed, a feeding roller configured to feed the medium to the processing tray, and a discharge roller pair configured to discharge the medium from the processing tray, wherein the discharge roller pair includes a first roller that comes into contact with a first surface as a surface where the medium comes into contact with the processing tray, and a second roller that is a roller that comes into contact with a second surface opposite to the first surface of the medium, and that is switchable between a first state of being configured to nip, together with the first roller, the medium, and a second state of being farther from the first roller than in the first state, a control portion that controls state switching of the second roller is configured to switch between a first mode in which the medium is fed to and placed on the processing tray by the feeding roller while the second roller is in the second state, the second roller is switched from the second state to the first state, and the medium placed on the processing tray is discharged by the discharge roller pair, and a second mode in which the medium is discharged by the feeding roller and the discharge roller pair without being placed on the processing tray while the first state of the second roller is maintained.

Additionally, a recording system of the present disclosure includes a recording apparatus including a recording portion that performs recording on a medium, and the medium processing apparatus configured to perform processing on the medium on which recording is performed by the recording apparatus.

Additionally, a method of controlling a medium processing apparatus of the present disclosure is a method of controlling a medium processing apparatus including a feeding portion that transports a medium, a processing tray on which the medium transported by the feeding portion is placeable, a processing portion configured to process the medium on the processing tray, and a discharging portion configured to discharge the medium placed on the processing tray, the method including a procedure for selecting any of a first mode and a second mode, wherein the first mode is a mode in which the medium transported by the feeding portion is placed on the processing tray and then discharged by the discharging portion, and the second mode is a mode in which the medium transported by the feeding portion is discharged by the discharging portion without being placed on the processing tray.

DESCRIPTION OF EMBODIMENTS

Figure 1:
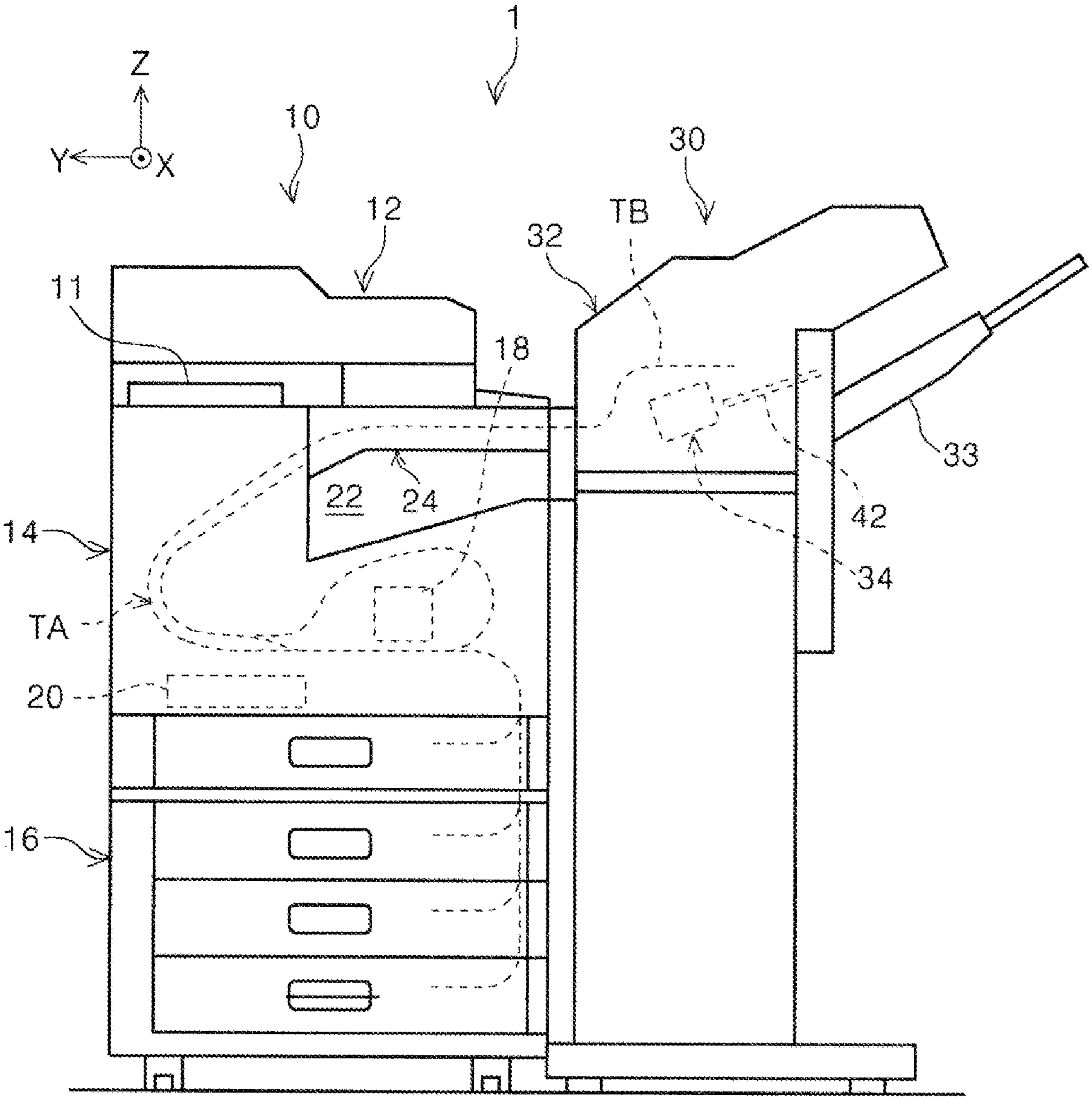
FIG. 1 is a front view of a recording system.

Hereinafter, the present disclosure will be schematically described.

A medium processing apparatus according to a first aspect includes a processing portion configured to perform processing on a medium, a processing tray on which the medium subjected to the processing is placed, a feeding roller configured to feed the medium to the processing tray, and a discharge roller pair configured to discharge the medium from the processing tray, wherein the discharge roller pair includes a first roller that comes into contact with a first surface as a surface where the medium comes into contact with the processing tray, and a second roller that is a roller that comes into contact with a second surface opposite to the first surface of the medium, and that is switchable between a first state of being configured to nip, together with the first roller, the medium, and a second state of being farther from the first roller than in the first state, a control portion that controls state switching of the second roller is configured to switch between a first mode in which the medium is fed to and placed on the processing tray by the feeding roller while the second roller is in the second state, the second roller is switched from the second state to the first state, and the medium placed on the processing tray is discharged by the discharge roller pair, and a second mode in which the medium is discharged by the feeding roller and the discharge roller pair without being placed on the processing tray while the first state of the second roller is maintained.

According to the aspect, when the control portion performs the first mode, it is possible to obtain a state where the medium is placed on the processing tray and can be processed by the processing portion. In the specification, "a medium is placed on the processing tray" means that a state occurs in which the medium is temporarily stopped and stays on the processing tray.

In addition, when the control portion performs the second mode, the medium fed to the processing tray by the feeding roller is discharged as is, without being placed on the processing tray in order to be processed by the processing portion. As described above, it is possible to meet a user's need to discharge the medium as is without being processed by the processing portion.

In addition, in the first mode, advancement and retraction operation of the second roller with respect to the first roller intervenes every time the medium is discharged, whereas in the second mode, the second roller does not perform the advancement and retraction operation with respect to the first roller every time the medium is discharged, an operation sound can be suppressed, and it is possible to provide a medium processing apparatus with a quiet operation sound.

A second aspect is the first aspect that includes a rear end aligning portion configured to align a rear end in a transport direction of the medium placed on the processing tray, and a side end aligning portion configured to align a side end in a width direction intersecting the transport direction of the medium placed on the processing tray, wherein in the first mode, after the medium is fed to the processing tray, the alignment of the rear end by the rear end aligning portion and the alignment of the side end by the side end aligning portion are performed, and in the second mode, the alignment of the rear end by the rear end aligning portion and the alignment of the side end by the side end aligning portion are not performed.

According to the aspect, in the second mode, since the alignment of the rear end by the rear end aligning portion and the alignment of the side end by the side end aligning portion are not performed, it is possible to further suppress the operation sound of the apparatus.

A third aspect is the second aspect that includes a movable portion being a portion including the second roller, and configured to switch between an advancement state to bring the second roller into the first state and a retraction state to bring the second roller into the second state, wherein the movable portion includes a guide member being a member disposed at a position facing the processing tray, and configured to switch between a guide state to guide the medium to the rear end aligning portion when the movable portion is in a retraction state, and a separation state to be farther from the processing tray than in the guide state.

According to the aspect, it is possible to appropriately guide the medium to the rear end aligning portion by the guide member.

Note that the aspect is not limited to the second aspect and may be applied to the first aspect.

A fourth aspect is the third aspect that includes a curvature imparting portion configured to impart a curvature along the width direction to the medium fed to the processing tray by the feeding roller.

According to the aspect, since the curvature imparting portion that imparts the curvature along the width direction to the medium fed to the processing tray by the feeding roller is included, it is possible to prevent the medium fed to the processing tray from being curled along a feeding direction to the processing tray, and to appropriately feed the medium to the processing tray.

Note that, the aspect is not limited to the third aspect and may be applied to the first or second aspect.

A fifth aspect is the fourth aspect wherein the curvature imparting portion includes a driven roller that comes into contact with the first surface of the medium and is driven to rotate, and a sheet material that is a sheet that comes into contact with the second surface of the medium and is disposed at a position shifted from the driven roller in the width direction.

According to the aspect, since the curvature imparting portion is configured to impart the curvature to the medium by the driven roller and the sheet material, it is possible to configure the curvature imparting portion with a simple structure and low cost.

A sixth aspect is the fifth aspect, wherein the driven roller and the sheet material are located on either side of a center position of the medium in the width direction, the sheet material is located at a position farther from the center position than the driven roller, the guide member is provided on either side of the center position in the width direction, in addition, the guide member is movable along the width direction under the control of the control portion, and the control portion disposes the guide member at a position overlapping the sheet material or at a position farther from the center position than the sheet material before feeding the medium to the processing tray by the feeding roller when a size of the medium in the width direction is such a size that the medium comes into contact with the sheet material.

In the configuration in which the curvature is imparted to the medium by the curvature imparting portion, there is a possibility that the medium floats and a leading end of the medium collides with the guide member to cause a jam.

Here, the floating of the medium is suppressed by the sheet material at the position of the sheet material or at a position farther from the center position than the sheet material in the width direction. Therefore, when the size of the medium in the width direction is such a size that the medium comes into contact with the sheet material, the control portion disposes the guide member at a position overlapping the sheet material or a position farther from the center position than the sheet material before feeding the medium to the processing tray by the feeding roller, thus, it is possible to suppress a situation in which a floating portion of the leading end of the medium collides with the guide member and causes a jam.

A seventh aspect is the second aspect, wherein in a case where the second mode is selected, when a recording duty of the medium exceeds a predetermined threshold value, the control portion cancels the second mode and performs the first mode.

When the recording duty of the medium exceeds the predetermined threshold value, the medium is likely to be curled, and when the medium is discharged as is by the second mode, there is a possibility that a stacking state is disturbed at a discharge destination of the medium by the discharge roller pair.

According to the aspect, in the case where the second mode is selected, when the recording duty of the medium exceeds the predetermined threshold value, the control portion cancels the second mode and performs the first mode, thus, it is possible to suppress a situation in which the stacking state at the discharge destination of the medium by the discharge roller pair is disturbed.

Note that the aspect is not limited to the above-described second aspect, and may also be applied to any of the above-described third to sixth aspects.

An eighth aspect is the second aspect, wherein in a case where the second mode is selected, when the number of discharged media exceeds a predetermined number, the control portion cancels the second mode and performs the first mode.

When the number of discharged media exceeds the predetermined number and the medium is subsequently discharged by the second mode, there is a possibility that the stacking state is disturbed at the discharge destination of the medium by the discharge roller pair.

According to the aspect, in the case where the second mode is selected, when the number of discharged media exceeds the predetermined number, the control portion cancels the second mode and performs the first mode, thus, it is possible to suppress a situation in which the stacking state at the discharge destination of the medium by the discharge roller pair is disturbed.

Note that the aspect is not limited to the above-described second aspect, and may also be applied to any of the above-described third to seventh aspects.

A ninth aspect is the first aspect, wherein the first mode and the second mode are selectable via an operation portion for performing various operations.

According to the aspect, since the first mode and the second mode can be selected via the operation portion for performing the various operations, it is possible to select the first mode and the second mode with ease of operation.

Note that the aspect is not limited to the first aspect and may be applied to any one of the second to eighth aspects.

A recording system according to a tenth aspect includes a recording apparatus including a recording portion that performs recording on a medium, and the medium processing apparatus according to any one of the first to ninth aspects configured to perform processing on the medium on which recording is performed by the recording apparatus.

According to the aspect, in the recording system, the operational effects of any one of the above-described first to ninth aspects can be obtained.

An eleventh aspect is the tenth aspect, wherein the recording portion performs recording by discharging liquid onto the medium.

According to the aspect, in a configuration in which recording is performed by discharging the liquid onto the medium, the operational effects of any one of the above-described first to ninth aspects can be obtained.

A method of controlling a medium processing apparatus according to a twelfth aspect is a method of controlling a medium processing apparatus including a processing portion that performs processing on a medium, a processing tray on which the medium subjected to the processing is placed, a feeding roller that feeds the medium to the processing tray, and a discharge roller pair that discharges the medium from the processing tray, the discharge roller pair including a first roller that comes into contact with a first surface as a surface where the medium comes into contact with the processing tray, and a second roller that is a roller that comes into contact with a second surface opposite to the first surface of the medium, and that is switchable between a first state of being configured to nip, together with the first roller, the medium, and a second state of being farther from the first roller than in the first state, the method including a procedure for selecting any of a first mode and a second mode, wherein the first mode is a mode in which the medium is fed to and placed on the processing tray by the feeding roller while the second roller is in the second state, the second roller is switched from the second state to the first state, and the medium placed on the processing tray is discharged by the discharge roller pair, and the second mode is a mode in which the medium is discharged by the feeding roller and the discharge roller pair without being placed on the processing tray while the first state of the second roller is maintained.

According to the aspect, when the first mode is performed, it is possible to obtain a state where the medium is placed on the processing tray and can be processed by the processing portion. In addition, when the second mode is performed, the medium fed to the processing tray by the feeding roller is discharged as is, without being placed on the processing tray in order to be processed by the processing portion. As described above, it is possible to meet a user's need to discharge the medium as is without being processed by the processing portion.

In addition, in the first mode, the advancement and retraction operation of the second roller with respect to the first roller intervenes every time the medium is discharged, whereas in the second mode, the second roller does not perform the advancement and retraction operation with respect to the first roller every time the medium is discharged, an operation sound can be suppressed.

Hereinafter, the present disclosure will be specifically described.

Hereinafter, a medium processing apparatus 30 and a recording system 1 according to an embodiment of the present disclosure will be described.

In each drawing, an X-axis direction is an apparatus depth direction of the medium processing apparatus 30 and the recording system 1. A +X direction of the X-axis direction is a direction from an apparatus back surface toward an apparatus front surface, and a −X direction is a direction from the apparatus front surface toward the apparatus back surface. Additionally, the X-axis direction is an example of a medium width direction.

A Y-axis direction is an apparatus width direction of the medium processing apparatus 30 and the recording system 1, and in the Y-axis direction, a +Y direction is a left direction and a −Y direction is a right direction when viewed from a user facing the apparatus front surface.

A Z-axis direction is an apparatus height direction of the medium processing apparatus 30 and the recording system 1, and is a vertical direction, a +Z direction is a vertically upward direction, and a −Z direction is a vertically downward direction. In the following description, the +Z direction may be simply referred to as an upward direction and the −Z direction may be simply referred to as a downward direction.

As illustrated in FIG. 1, the recording system 1 includes a recording apparatus 10 and the medium processing apparatus 30. The recording apparatus 10 according to the embodiment is an inkjet printer that performs recording by discharging ink, which is an example of liquid, onto a medium represented by recording paper, and includes a line head 18, which is an example of a recording portion. Further, the recording apparatus 10 is a so-called multifunction machine including a scanner portion 12 at an upper portion of the apparatus.

However, the recording apparatus 10 is not limited to an inkjet printer, and may be an apparatus that performs recording by another method, such as a laser printer, a thermal transfer printer, or a dot impact printer.

The recording apparatus 10 includes a main body 14, a medium accommodation portion 16 that accommodates a medium, a medium transport portion (not illustrated) that transports the medium, the line head 18 that performs recording on the medium, an in-body discharging portion 22 to which the medium is discharged, a relay portion 24 that transports the medium to the medium processing apparatus 30, and a control portion 20 that controls the recording apparatus 10 and the medium processing apparatus 30. A transport path TA through which a medium is transported is provided inside the main body 14.

An operation portion 11 for performing various operations is provided at an upper portion of the main body 14. The control portion 20 performs various types of control based on various types of setting information set via the operation portion 11 and a performance instruction instructed via the operation portion 11. The operation portion 11 may include, as an example, a touch panel and various buttons. However, it goes without saying that the control portion 20 can receive various settings and various performance instructions based on information transmitted from an external computer (not illustrated) that can access the recording system 1.

The control portion 20 includes a CPU, a RAM, a non-volatile memory, and the like (not illustrated), and programs for achieving various types of control described below and various parameters necessary for executing the programs are stored in the non-volatile memory described above.

Note that in the embodiment, the control portion 20 is provided at the recording apparatus 10, but may be provided at the medium processing apparatus 30.

The line head 18 includes a plurality of ink discharge nozzles (not illustrated) disposed corresponding to an entire region in the X-axis direction of a medium. The line head 18 performs recording on a medium by discharging ink supplied from an ink tank (not illustrated) from the plurality of ink discharge nozzles toward the medium.

A medium on which recording is performed by the recording apparatus 10 is fed to the medium processing apparatus 30 via the relay portion 24. The medium processing apparatus 30 includes an apparatus main body 32, a processing tray 42 provided inside the apparatus main body 32, a stapler 34 which is an example of a processing portion, and a main tray 33 provided outside the apparatus main body 32.

A medium delivered from the relay portion 24 to the apparatus main body 32 is transported along a transport path TB inside the apparatus main body 32 and fed to the processing tray 42.

Figure 8:
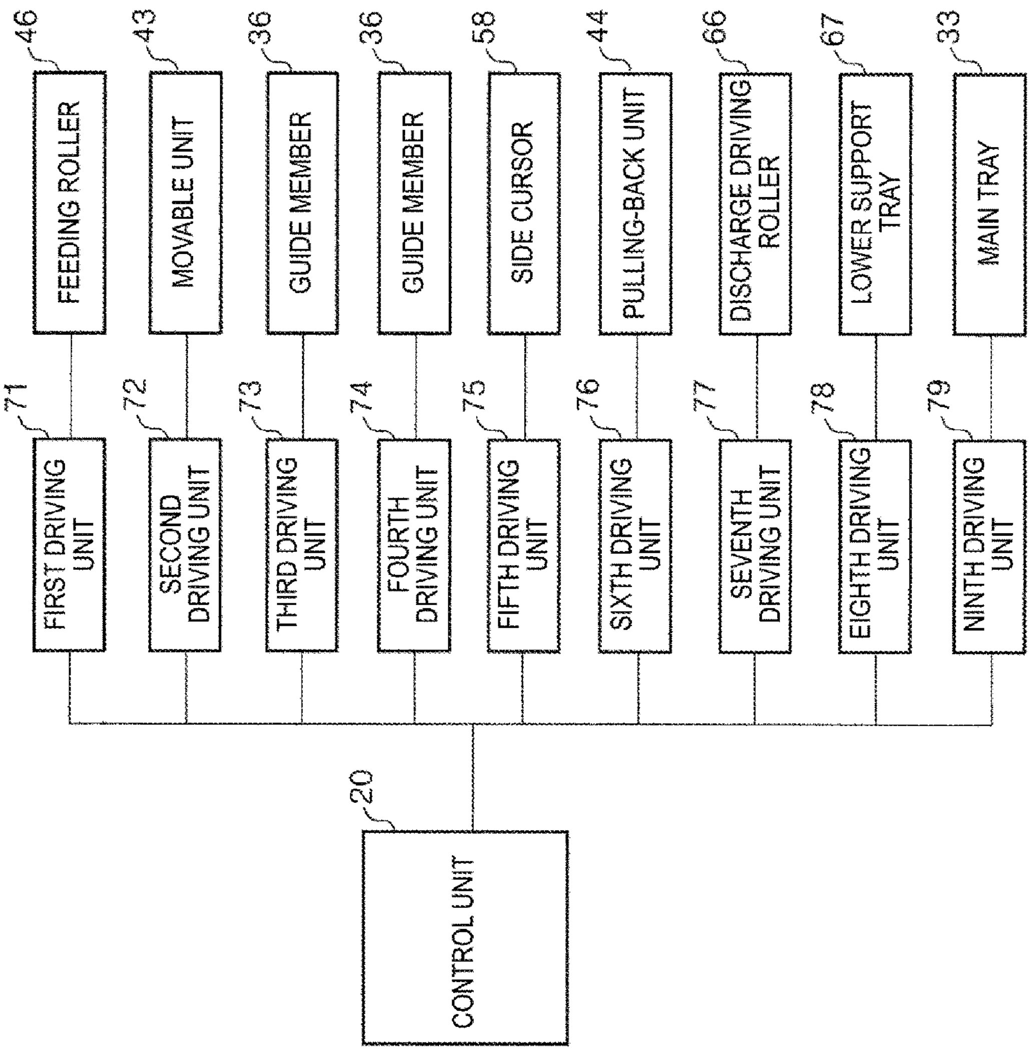
FIG. 8 is a block diagram illustrating a control system of the medium processing apparatus.

Hereinafter, a configuration of the medium processing apparatus 30 will be further described mainly with reference to FIGS. 2, 3, and 8, and further with reference to other drawings as appropriate. Hereinafter, a medium is denoted by a reference sign P and is referred to as a medium P. In addition, a bundle of media including a plurality of the media P is denoted by a reference sign Pt and is referred to as a medium bundle Pt. In addition, a surface of the medium P that comes into contact with a support surface 42*a* of the processing tray 42 may be referred to as a first surface, and a surface on an opposite side may be referred to as a second surface. A single medium P or the medium bundle Pt is placed on the processing tray 42.

Note that a direction along the support surface 42*a* of the processing tray 42 is an A-axis direction, and a +A direction in the A-axis direction is a discharge direction in which the medium bundle Pt is discharged from the processing tray 42. Hereinafter, the +A direction may be simply referred to as a discharge direction. In the embodiment, the +A direction is a direction including a +Z direction component and a −Y direction component. In addition, a −A direction is a direction in which the medium P on the processing tray 42 is pulled back toward a rear end aligning portion 39.

Additionally, a direction orthogonal to the A-axis direction viewed from the X-axis direction is a B-axis direction.

The medium P fed to the processing tray 42 passes between an upper guide member 35*a* and a lower guide member 35*b* and reaches a feeding roller 46. The upper guide member 35*a* and the lower guide member 35*b* constitute a part of the transport path TB and extend toward the processing tray 42. That is, a part of the transport path TB is formed between the upper guide member 35*a* and the lower guide member 35*b*. The medium P transported in the −Y direction between the upper guide member 35*a* and the lower guide member 35*b* is fed to the processing tray 42 by the feeding roller 46. A reference sign 46*a* denotes a rotary shaft of the feeding roller 46. Additionally, a reference sign 47 denotes a driven roller that nips, together with the feeding roller 46, the medium P. The feeding roller 46 comes into contact with the second surface of the medium P, and the driven roller 47 comes into contact with the first surface of the medium P.

The feeding roller 46 is driven by a first driving portion 71 (FIG. 8) under the control of the control portion 20. As an example, the first driving portion 71 can be configured by a motor, a gear, and the like.

Figure 7:
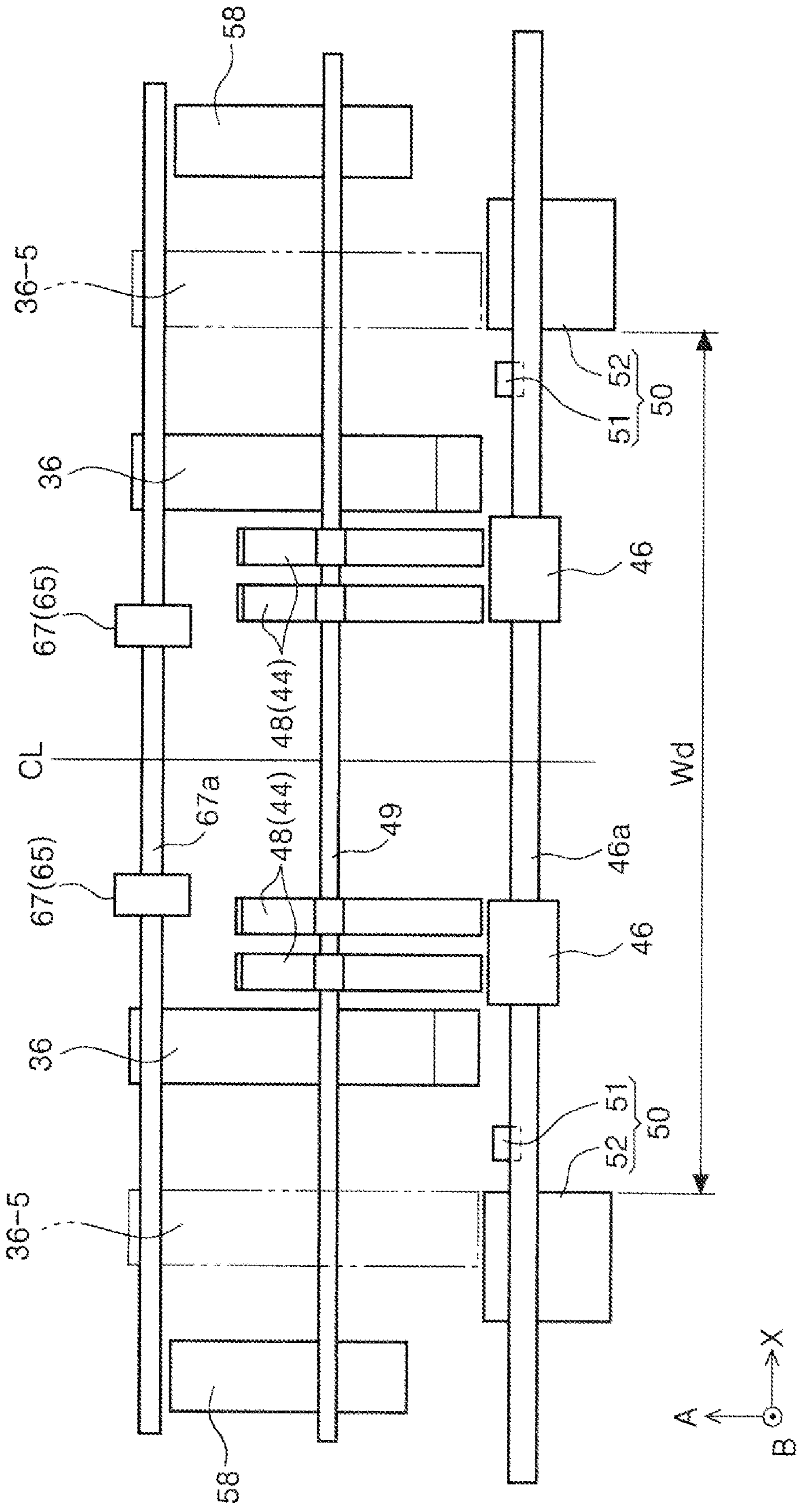
FIG. 7 is a plan view of a main part of the medium processing apparatus.

In the embodiment, as illustrated in FIG. 7, the feeding roller 46 is disposed on either side of a center position CL in the X-axis direction, that is, the medium width direction, so that a distance from the center position CL is identical. The center position CL is a position that is a width direction center of the medium P regardless of a size of the medium P.

Referring back to FIGS. 2 and 3, the medium P fed to the processing tray 42 by the feeding roller 46 is handled differently between the first mode and the second mode performed by the control portion 20.

Although the first mode and the second mode will be described later, the first mode is a mode in which the medium P is placed on the processing tray 42, aligned, subjected to binding processing by the stapler 34 as necessary, and then discharged to a lower support tray 60 described later.

Further, the second mode is a mode in which the medium P is discharged to the main tray 33 as is without being placed on the processing tray 42 and further without being placed on the lower support tray 60. Note that in the embodiment, placing the medium P on the processing tray 42 means that the medium P moves on the processing tray 42 in the −A direction, that is, a direction opposite to the discharge direction, and temporarily stays on the processing tray 42.

Hereinafter, the configuration of the medium processing apparatus 30 will be further described by exemplifying processing when the first mode is performed. The medium P fed to the processing tray 42 is pulled back in the −A direction toward the rear end aligning portion 39 by a pulling-back portion 44. The pulling-back portion 44 includes a first paddle 48 and a second paddle 54.

The first paddle 48 is made of an elastic material such as a rubber material, and is provided so as to be rotatable around a rotary shaft 49 extending in the X-axis direction. The first paddle 48 is driven in a clockwise direction in FIG. 2 by a motor (not illustrated) to impart feeding force in the −A direction to the second surface of the medium P fed to the processing tray 42.

Similarly to the first paddle 48, the second paddle 54 is made of an elastic material such as a rubber material and is provided so as to be rotatable about a rotary shaft 55 extending in the X-axis direction. The second paddle 54 is driven in the clockwise direction in FIG. 2 by a motor (not illustrated) to impart feeding force in the −A direction to the second surface of the medium P fed to the processing tray 42.

The pulling-back portion 44 is driven by a sixth driving portion 76 (FIG. 8) under the control of the control portion 20. As an example, the sixth driving portion 76 can be configured by a motor, a gear, and the like.

The rear end aligning portion 39 is provided in the −A direction with respect to the processing tray 42. The rear end aligning portion 39 includes an alignment surface **39*a* parallel to the B-axis direction, and a rear end Pe of the medium P on the processing tray 42 abuts against the alignment surface 39*a***, whereby the rear end Pe is aligned. Hereinafter, this may be referred to as rear end alignment processing.

Note that a leading end of the medium P having a size greater than a dimension of the processing tray 42 in the discharge direction protrudes from the processing tray 42 in the +A direction, and the protruding leading end is supported by the lower support tray 60.

A side cursor 58 as a side end aligning portion is provided so as to be movable in the X-axis direction, and comes into contact with an end portion in the X-axis direction of the medium P or the medium bundle Pt supported by the processing tray 42 to align the end portion. Hereinafter, this may be referred to as side end alignment processing.

The side cursor 58 is driven by a fifth driving portion 75 (FIG. 8) under the control of the control portion 20. The fifth driving portion 75 can be configured by a motor and a belt driving mechanism, for example.

As illustrated in FIG. 7, the side cursor 58 is disposed on either side of the center position CL in the X-axis direction, that is, the medium width direction, so that a distance from the center position CL is identical. The two side cursors 58 are provided so as to approach each other or separate from each other under the control of the control portion 20. The two side cursors 58 may be driven by a single motor or may be individually driven by separate motors.

Referring back to FIGS. 2 and 3, a flap 37 is provided in a vicinity of the rear end aligning portion 39. The flap 37 is provided so as to be swingable about a shaft portion **37*a* extending in the X-axis direction. The flap 37 presses the medium P or the medium bundle Pt on the processing tray 42 downward in a vicinity of the rear end aligning portion 39**.

A guide member 36 is provided at a position facing the processing tray 42. The guide member 36 is provided so as to be swingable about a shaft that extends in the X-axis direction and is a shaft **67*a* of a discharge driven roller 67 described later, and swings to switch between a guide state to guide the medium P to the rear end aligning portion 39 and a separation state to be farther from the processing tray 42** than in the guide state.

The guide member 36 is driven to swing by a third driving portion 73 (FIG. 8) under the control of the control portion 20. As an example, the third driving portion 73 can be configured by a motor, a gear, and the like, or can be configured by another actuator such as a solenoid.

Figure 2:
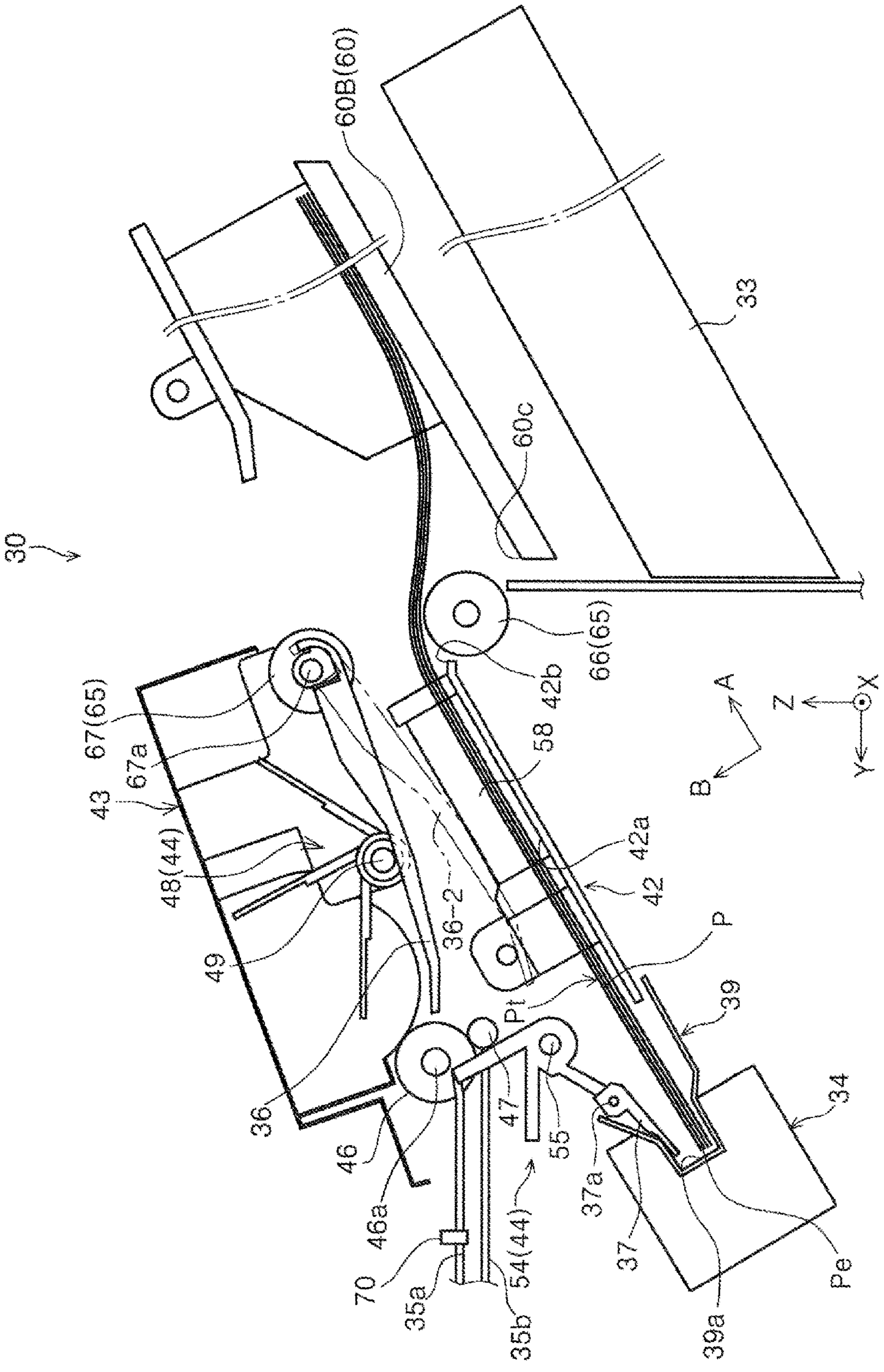
FIG. 2 is a diagram illustrating an internal configuration of a medium processing apparatus, and is a diagram illustrating a state where a discharge driven roller is retracted from a discharge driving roller.

In FIG. 2, the guide member 36 indicated by a solid line indicates the guide member 36 in the separation state, and a two-dot chain line and a reference sign 36-2 indicate the guide member 36 in the guide state. Switching between the guide state and the separation state of the guide member 36 is performed in a state where the discharge driven roller 67 described below is separated from a discharge driving roller 66 as illustrated in FIG. 2, that is, in a state where a discharge roller pair 65 does not discharge the medium P or the medium bundle Pt.

A medium detection portion 70 is provided upstream of the feeding roller 46, and the control portion 20 that controls the state of the guide member 36 switches the guide member 36 from the separation state to the guide state after the rear end Pe of the medium P passes through the feeding roller 46 based on detection information of the medium detection portion 70, and knocks down the medium P toward the processing tray 42.

In addition, the guide member 36 guides the medium P fed toward the rear end aligning portion 39 on the processing tray 42 to the rear end aligning portion 39. Thus, the rear end Pe of the medium P fed toward the processing tray 42 appropriately abuts against the rear end aligning portion 39.

Note that, as illustrated in FIG. 7, the guide member 36 is disposed on either side of the center position CL in the X-axis direction, that is, the medium width direction, so that a distance from the center position CL is identical. The two guide members 36 can be moved in the X-axis direction, that is, the medium width direction by a fourth driving portion 74 (FIG. 8) under the control of the control portion 20, and the two guide members 36 are moved so as to approach each other or separate from each other. The fourth driving portion 74 can be configured by a motor and a belt driving mechanism, for example. The two guide members 36 may be driven by a single motor or may be individually driven by separate motors.

Returning back to FIGS. 2 and 3, the discharge roller pair 65 that discharges the medium P or the medium bundle Pt supported by the processing tray 42 in the +A direction is provided in the +A direction with respect to the processing tray 42. The discharge roller pair 65 includes the discharge driven roller 67 capable of coming into contact with the medium P or the medium bundle Pt from above the medium P or the medium bundle Pt supported by the processing tray 42, and the discharge driving roller 66 capable of coming into contact with the medium P or the medium bundle Pt from below the medium P or the medium bundle Pt supported by the processing tray 42. The discharge driving roller 66 is an example of a first roller that comes into contact with the first surface of the medium P, and the discharge driven roller 67 is an example of a second roller that comes into contact with the second surface of the medium P.

The discharge driving roller 66 is driven by a seventh driving portion 77 (FIG. 8) under the control of the control portion 20. As an example, the seventh driving portion 77 can be configured by a motor, a gear, and the like.

The discharge driven roller 67 comes into contact with the medium P or the medium bundle Pt to be driven to rotate.

Figure 3:
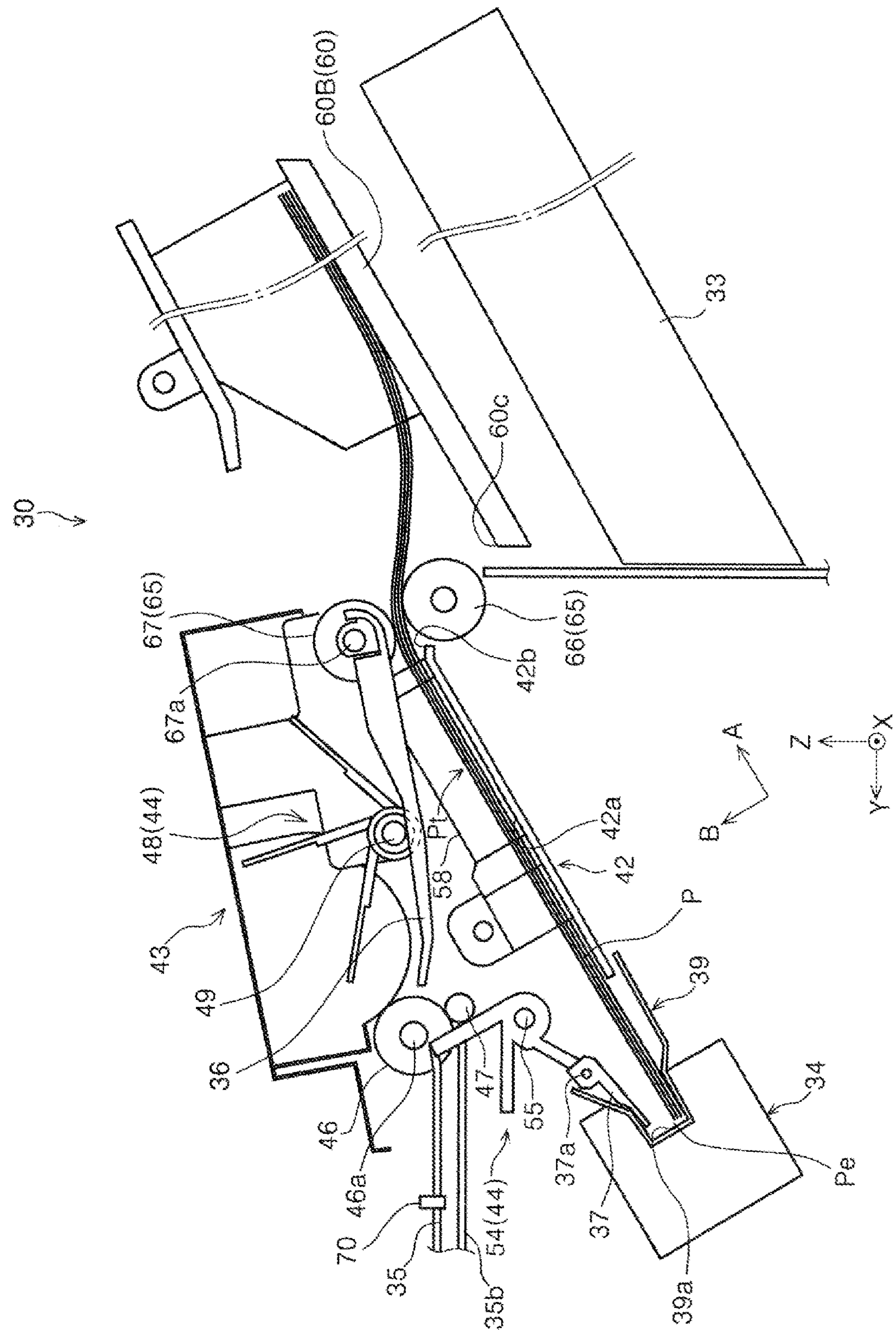
FIG. 3 is a diagram illustrating the internal configuration of the medium processing apparatus, and is a diagram illustrating a state where the discharge driven roller and the discharge driving roller can nip a medium.

The discharge driven roller 67 can switch between a state of advancing toward the discharge driving roller 66 and coming into contact with the medium P or the medium bundle Pt as illustrated in FIG. 3, that is, a first state of being capable of nipping, together with the discharge driving roller 66, the medium P or the medium bundle Pt, and a second state of being separated from the medium P or the medium bundle Pt as illustrated in FIG. 2.

The discharge driven roller 67 is provided at a movable portion 43 together with the guide member 36. The movable portion 43 is provided so as to be rotatable about a rotary shaft 46*a* of the feeding roller 46. The movable portion 43 is rotationally driven by a second driving portion 72 (FIG. 8) under the control of the control portion 20. As an example, the second driving portion 72 can be configured by a motor, a gear, and the like, or can be configured by another actuator such as a solenoid.

When the movable portion 43 rotates, the discharge driven roller 67 switches between the first state and the second state.

The discharge roller pair 65 discharges the medium P or the medium bundle Pt supported by the processing tray 42 toward the lower support tray 60. Note that the processing performed by the medium processing apparatus 30 in the embodiment is the binding processing by the stapler 34, but is not limited thereto, and may be punching processing for punching holes in the medium P or the medium bundle Pt, saddle stitching processing for performing saddle stitching on the medium bundle Pt, shifting/discharging processing for alternately shifting a discharge position of the medium P or the medium bundle Pt in the medium width direction and discharging the medium P or the medium bundle Pt, or the like. In addition, the medium P or the medium bundle Pt may be discharged without performing the processing by the medium processing apparatus 30, and the medium P or the medium bundle Pt may be stacked on the main tray 33 in a so-called stick-stacked manner.

Figure 4:
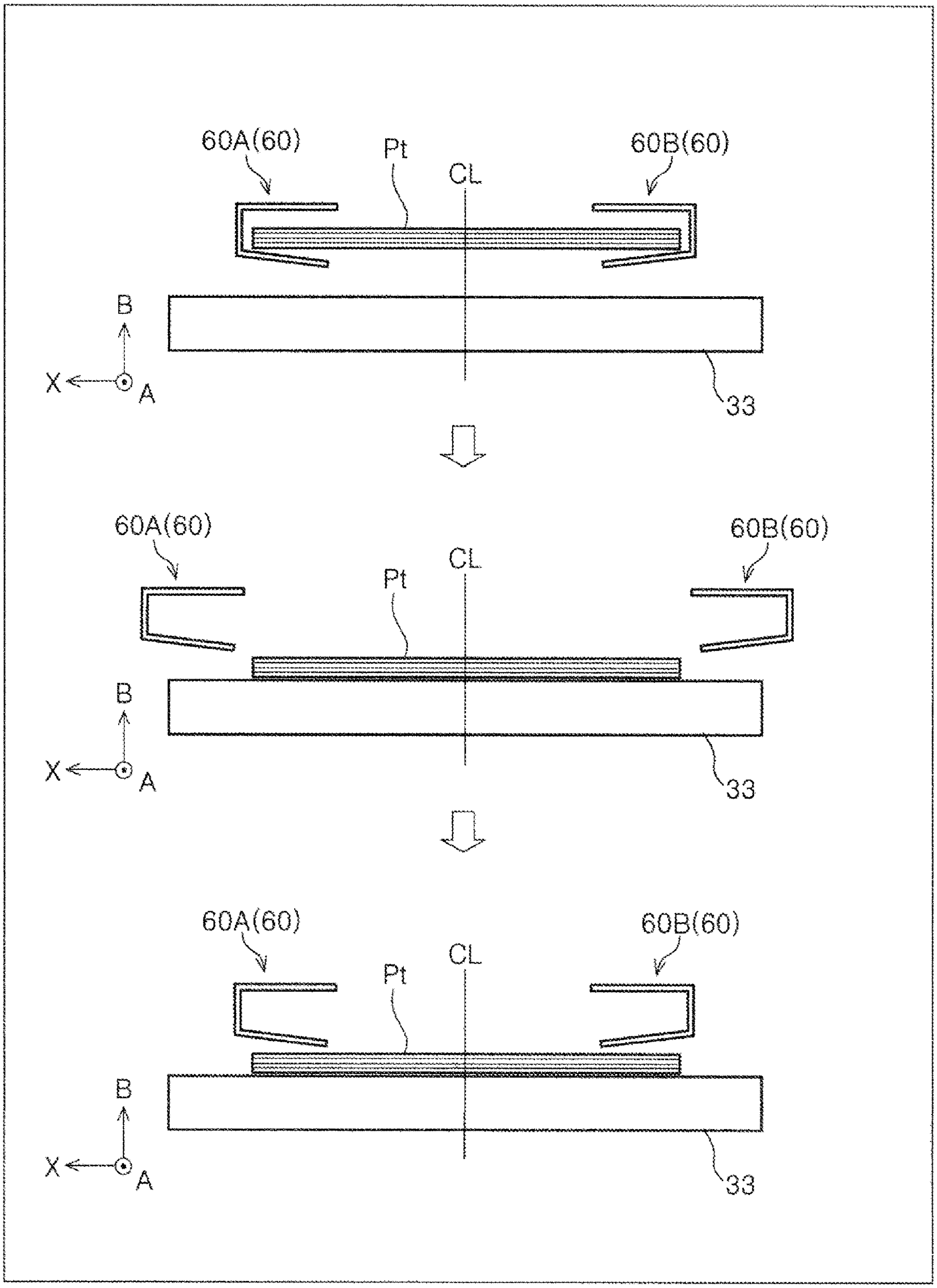
FIG. 4 is a diagram of the medium processing apparatus viewed from a discharge direction, and is a diagram illustrating an operational transition of a lower support tray.

As illustrated in FIG. 4, the lower support tray 60 includes a first moving tray 60A and a second moving tray 60B provided so as to be spaced apart from each other in the X-axis direction, that is, in the medium width direction. The lower support tray 60, that is, the first moving tray 60A and the second moving tray 60B, is an example of a pair of medium support portions. The first moving tray 60A is located in the +X direction with respect to the medium bundle Pt, and the second moving tray 60B is located in the −X direction with respect to the medium bundle Pt. Each of the first moving tray 60A and the second moving tray 60B is formed in a shape so as to sandwich an end portion in the X-axis direction of the medium bundle Pt in the B-axis direction.

The first moving tray 60A and the second moving tray 60B are driven in the X-axis direction by an eighth driving portion 78 (FIG. 8) under the control of the control portion 20. The eighth driving portion 78 can be configured by a motor and a belt driving mechanism, for example. The first moving tray 60A and the second moving tray 60B may be driven by a single motor or may be individually driven by separate motors.

In FIG. 4, the lower support tray 60 is opened or closed by the first moving tray 60A and the second moving tray 60B moving in directions opposite to each other. To be more specific, the lower support tray 60 is opened when the first moving tray 60A and the second moving tray 60B are separated away from each other, and is closed when the first moving tray 60A and the second moving tray 60B approach each other. In the X-axis direction, a distance between the first moving tray 60A and the center position CL and a distance between the second moving tray 60B and the center position CL are constantly the same.

Note that closing of the lower support tray 60 means that an interval between the first moving tray 60A and the second moving tray 60B in the X-axis direction is such an interval that the medium bundle Pt can be supported as illustrated in an uppermost diagram of FIG. 4. Further, opening of the lower support tray 60 means that the interval between the first moving tray 60A and the second moving tray 60B in the X-axis direction is such an interval that the medium bundle Pt is not supported and dropped onto the main tray 33 as illustrated in a second diagram from the top of FIG. 4.

The medium bundle Pt discharged from the processing tray 42 by the discharge roller pair 65 is temporarily supported by the lower support tray 60 in a closed state as illustrated in the uppermost diagram of FIG. 4. Then, when the lower support tray 60 is opened as illustrated in the second diagram from the top of FIG. 4, the medium bundle Pt supported by the lower support tray 60 drops onto the main tray 33. When the medium bundle Pt drops onto the main tray 33, the lower support tray 60 is closed as illustrated in a lowermost diagram of FIG. 4. When the lower support tray 60 is closed, the main tray 33 moves downward to support the next medium bundle Pt.

Since such a lower support tray 60 is included, it is possible to improve a stacking state of the medium bundle Pt on the main tray 33.

The main tray 33 is an example of a stacking portion on which the medium P or the medium bundle Pt that drops when the lower support tray 60 is opened. The main tray 33 is driven in the Z-axis direction by a ninth driving portion 79 (FIG. 8) under the control of the control portion 20. As an example, the ninth driving portion 79 can be configured by a motor and a linear motion mechanism. The control portion 20 lowers the main tray 33 in response to the medium P or the medium bundle Pt being stacked on the main tray 33.

Note that the first driving portion 71, the second driving portion 72, the third driving portion 73, the fourth driving portion 74, the fifth driving portion 75, the sixth driving portion 76, the seventh driving portion 77, the eighth driving portion 78, and the ninth driving portion 79 described above may all be individually configured or may be appropriately shared. In particular, a driving source such as a motor may be appropriately shared.

Note that as illustrated in FIGS. 2 and 3, an end portion 60*c* in the −A direction of the lower support tray 60 is positioned below an end portion 42*b* in the +A direction of the processing tray 42. That is, a step is provided between the processing tray 42 and the lower support tray 60. Accordingly, when the medium bundle Pt is discharged from the processing tray 42 to the lower support tray 60, the medium bundle Pt is easily moved to the lower support tray 60.

Next, a curvature imparting portion 50 provided in a vicinity of the feeding roller 46 in a medium transport direction will be described.

Figure 5:
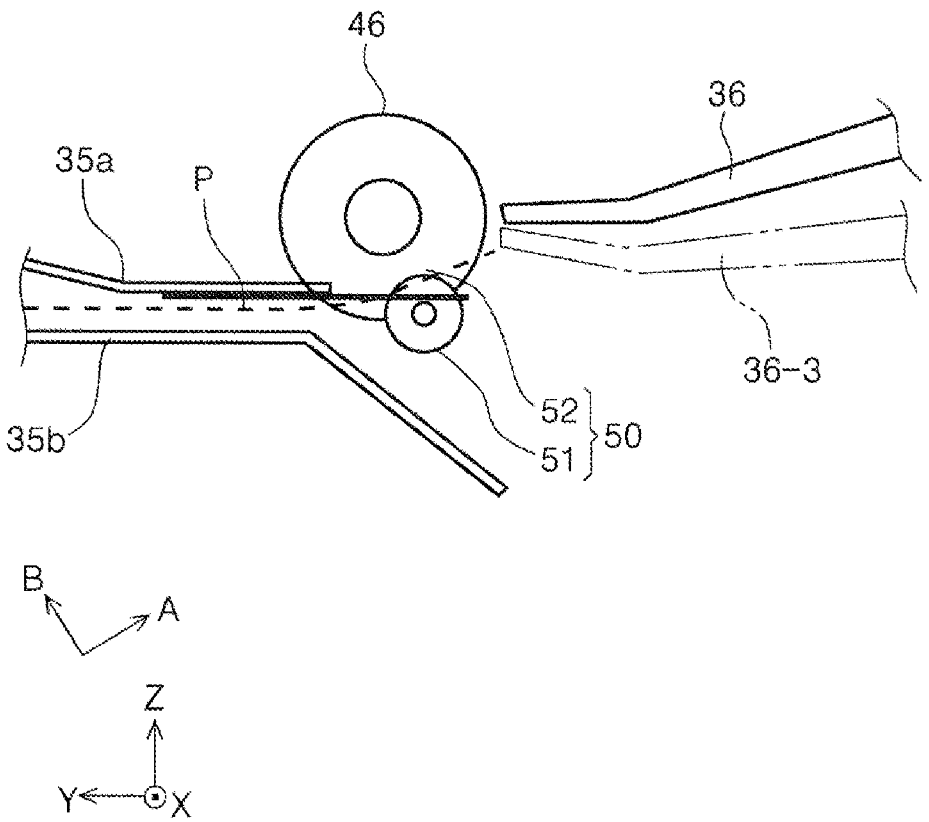
FIG. 5 is a diagram illustrating a configuration of a curvature imparting portion, and is a diagram of the curvature imparting portion viewed from a medium width direction.
Figure 6:
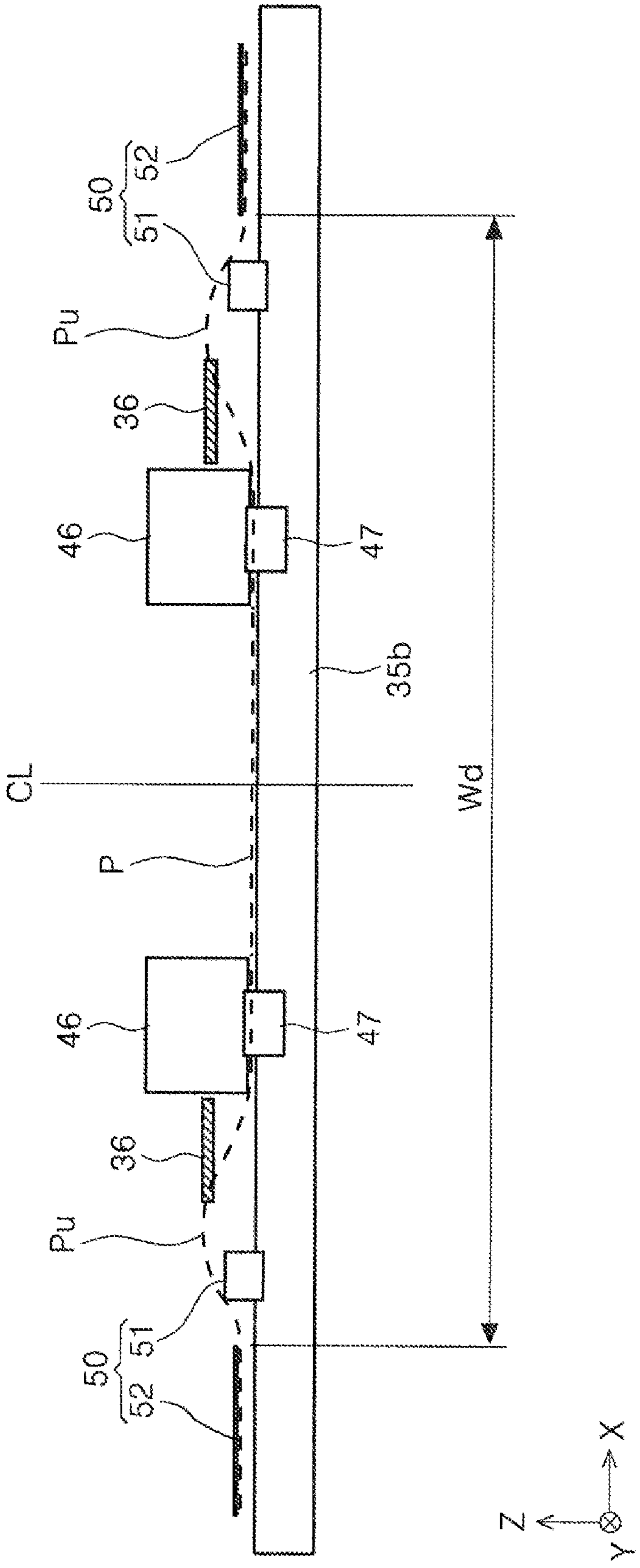
FIG. 6 is a diagram illustrating the configuration of the curvature imparting portion, and is a diagram of the curvature imparting portion viewed from a medium feeding direction.

The curvature imparting portion 50 is not illustrated in FIGS. 2 and 3, but is illustrated in FIGS. 5 and 6. The curvature imparting portion 50 is a portion that imparts a curvature along the medium width direction to the medium P fed to the processing tray 42 by the feeding roller 46. It is possible to prevent the medium P fed to the processing tray 42 from being curled along a feeding direction (the Y-axis direction) by the curvature imparting portion 50, and it is possible to appropriately feed the medium P to the processing tray 42.

In the embodiment, the curvature imparting portion 50 includes a driven roller 51 that comes into contact with the first surface of the medium P and is driven to rotate, and a sheet material 52 that is a sheet material that comes into contact with the second surface of the medium P and is disposed at a position shifted from the driven roller 51 in the medium width direction. As a result, it is possible to configure the curvature imparting portion 50 with a simple structure and low cost.

However, the curvature imparting portion 50 is not limited to such a configuration, and any portion may be used as long as the portion imparts a curvature along the medium width direction to the medium P.

As illustrated in FIG. 6, the driven roller 51 is disposed on either side of the center position CL, that is, the medium width direction, so that a distance from the center position CL is identical.

Additionally, the sheet materials 52 is similarly disposed on either side of the center position CL, that is, the medium width direction, so that a distance from the center position CL is identical.

The sheet material 52 is disposed at a position farther from the center position CL than the driven roller 51.

The sheet material 52 is an elastically deformable sheet material, and is formed of a PET (polyethylene terephthalate) sheet as an example.

As illustrated in FIG. 5, the driven roller 51 and the sheet material 52 are disposed so as to overlap each other when viewed from the medium width direction. Additionally, a nip position of the medium P by the feeding roller 46 and the driven roller 47 (see FIGS. 2 and 3) is lower than a position at which the medium P comes into contact with the driven roller 51.

With such a configuration, when the medium P passes through, as illustrated by a broken line in FIG. 6, a curvature along the medium width direction is imparted to the medium P, rigidity of the medium P in a medium feeding direction is improved, and curling is suppressed.

Next, the first mode and the second mode performed by the control portion 20 will be described.

The first mode is a mode in which the medium P is fed to and placed on the processing tray 42 by the feeding roller 46 in a state where the discharge driven roller 67 is brought into the second state (see FIG. 2), the rear end alignment processing by the rear end aligning portion 39 and the side end alignment processing by the side cursor 58 are performed, and further the binding processing by the stapler 34 is performed as necessary, and then the discharge driven roller 67 is switched from the second state to the first state (see FIG. 3) to discharge the medium P or the medium bundle Pt placed on the processing tray 42 by the discharge roller pair 65.

However, it is also possible to perform only one of the rear end alignment processing and the side end alignment processing, in the first mode.

The second mode is a mode in which the medium P is discharged by the feeding roller 46 and the discharge roller pair 65 without being placed on the processing tray 42, while the first state (see FIG. 3) of the discharge driven roller 67 is maintained. Therefore, in the second mode, the rear end alignment processing by the rear end aligning portion 39, the side end alignment processing by the side cursor 58, and the binding processing by the stapler 34 are all not performed. In addition, in the second mode, since the media P are continuously discharged one by one without being placed on the processing tray 42, the medium bundle Pt including the plurality of media P is not discharged in the second mode.

In the embodiment, the configuration is adopted in which a user can select from the first mode and the second mode via the operation portion 11 (see FIG. 1). However, the first mode and the second mode may be selected via an external computer (not illustrated) that can access the recording system 1.

Figure 10:
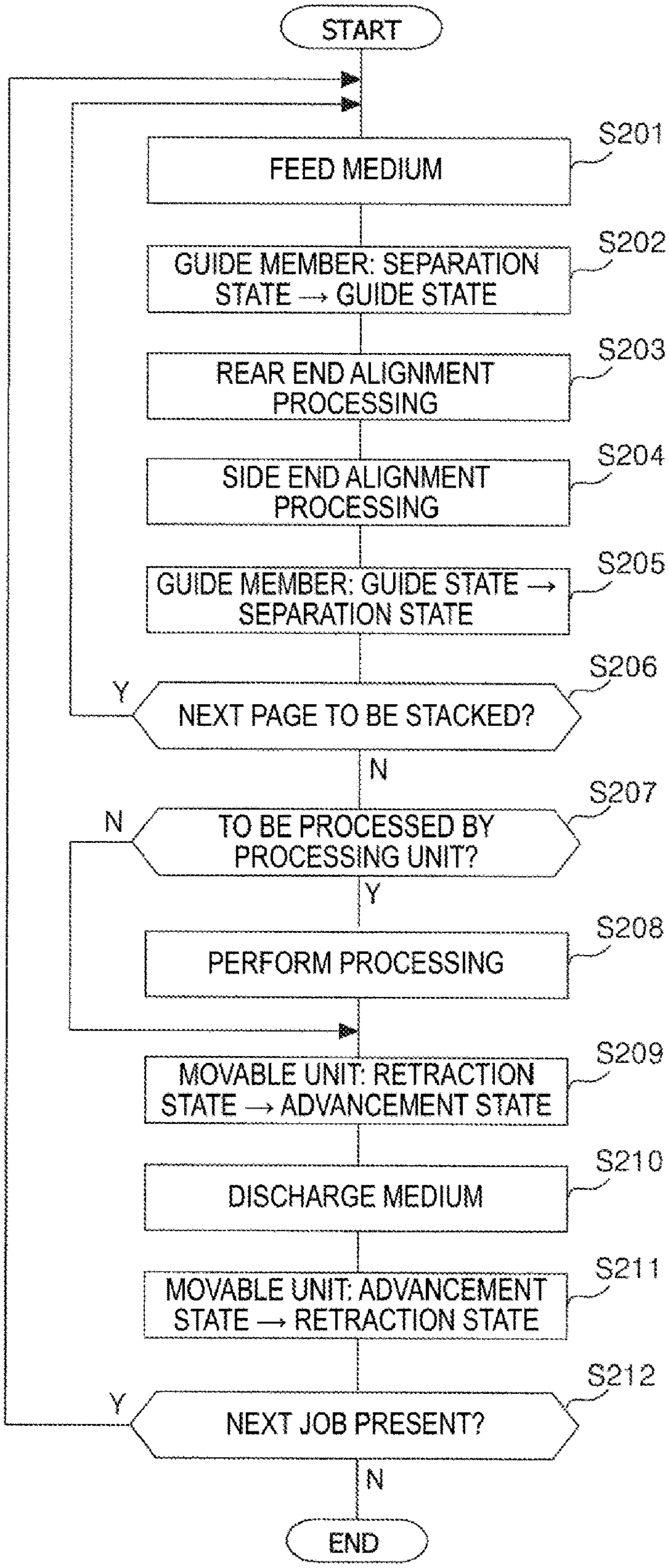
FIG. 10 is a flowchart illustrating a flow of processing in the first mode.
Figure 11:
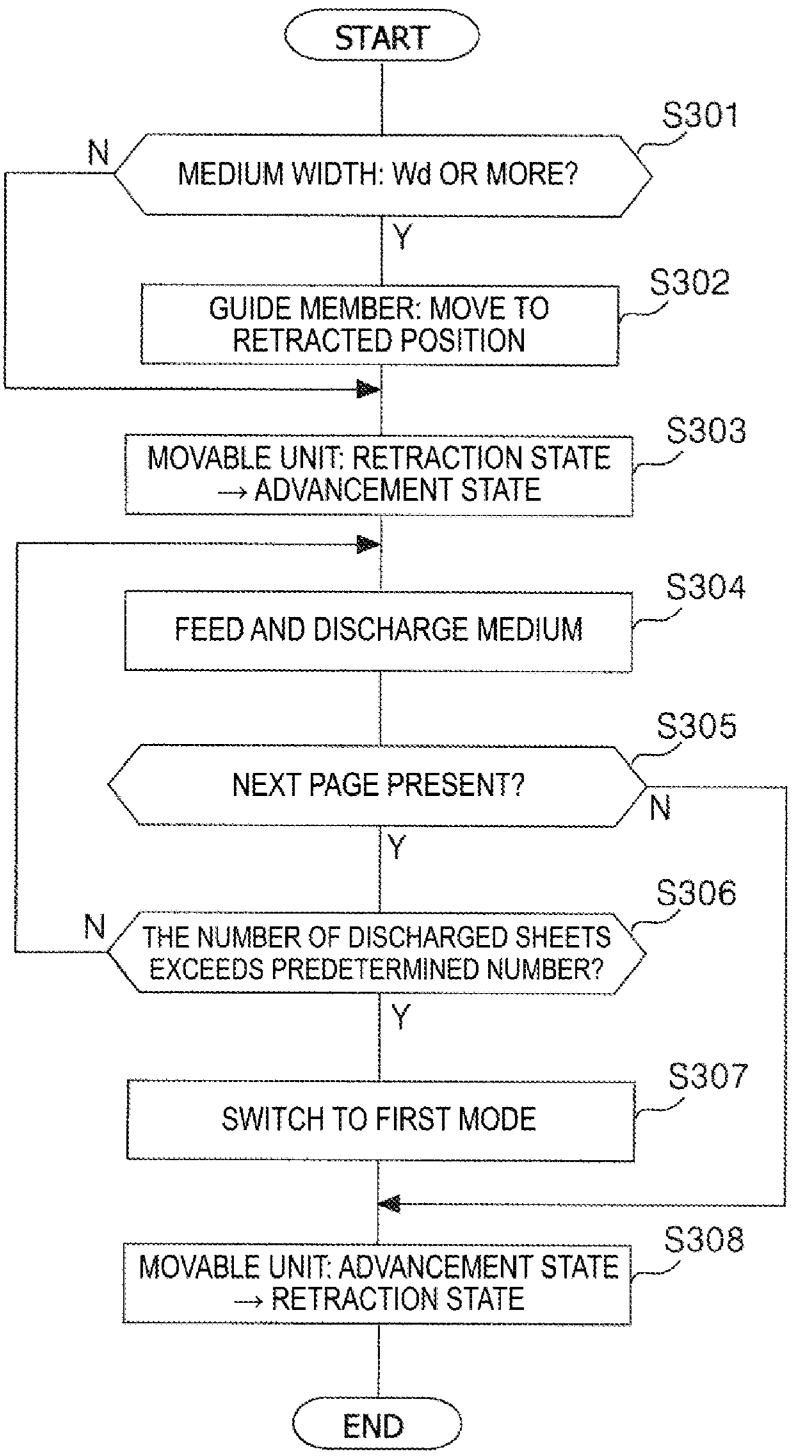
FIG. 11 is a flowchart illustrating a flow of processing in the second mode.

Further description will be given below by also referring to FIGS. 9 to 11.

Figure 9:
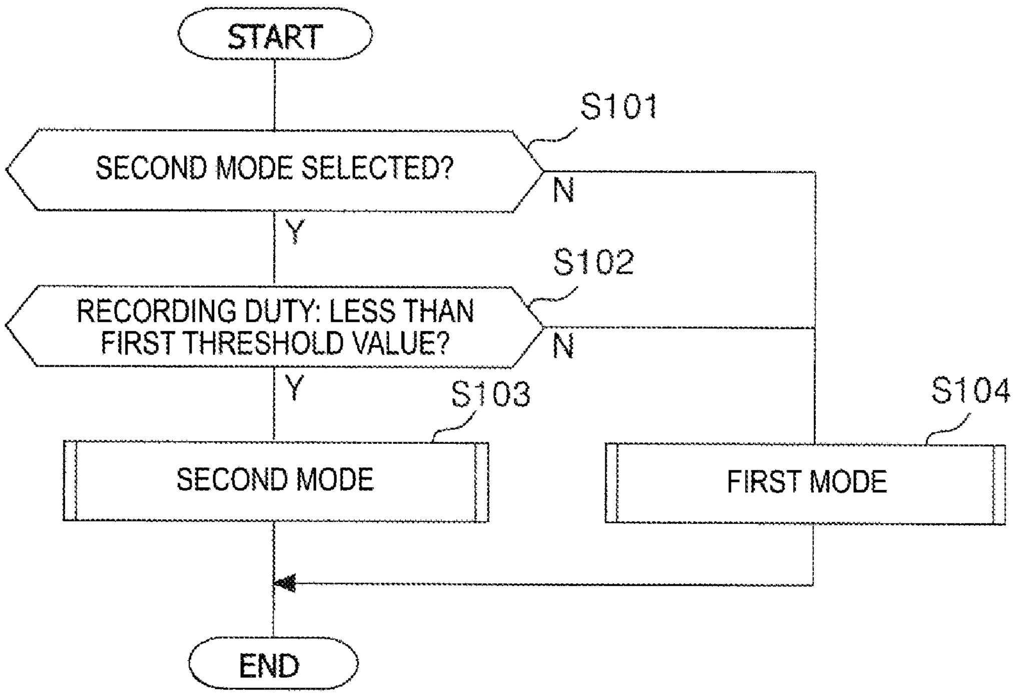
FIG. 9 is a flowchart illustrating a flow of selection between a first mode and a second mode.

FIG. 9 illustrates an example of mode determination processing performed by the control portion 20. When receiving a recording performance instruction by the recording apparatus 10, the control portion 20 determines which of the first mode and the second mode to perform in the medium processing apparatus 30.

First, the control portion 20 determines whether the second mode is selected based on information set with the operation portion 11 (see FIG. 1) or information transmitted from an external computer (not illustrated) (step S101). When the second mode is not selected (No in step S101), the control portion 20 selects the first mode (step S104).

When the second mode is selected (Yes in Step S101), the control portion 20 determines whether a recording duty is less than a first threshold value based on recording information (Step S102). The first threshold value is stored in a nonvolatile memory (not illustrated) included in the control portion 20. Note that when recording is performed for a plurality of pages, a maximum value is selected as the recording duty in step S102.

Here, the recording duty is a ratio of a portion area of a recording surface that is covered with ink, and for example, the recording duty of 50% means that 50% of the portion area of the recording surface is covered with the ink.

However, the recording duty may be a ratio of actually formed dots to dots that can be formed per portion area.

When the recording duty is less than the first threshold value (Yes in Step S102), the control portion 20 selects the second mode as requested (Step S103). Further, in a case where the recording duty is equal to or greater than the first threshold value (No in step S102), even when the second mode is selected, the control portion 20 cancels the second mode and selects the first mode (step S104). This is because in the second mode described later, alignment of the medium P is not performed on the processing tray 42 and the medium P is discharged to the main tray 33 as is, and therefore, when the recording duty is high, there is a possibility that a stacking state on the main tray 33 is disturbed due to curling.

As described above, in a case where the second mode is selected, when the recording duty of the medium P exceeds the first threshold value which is a predetermined threshold value, the control portion 20 cancels the second mode and performs the first mode, thus, it is possible to suppress a situation in which a stacking state at a discharge destination of the medium by the discharge roller pair 65 is disturbed.

Note that, as an example of the first threshold value, a recording duty of 20% can be adopted.

Next, the first mode will be described with reference to FIG. 10. In the first mode, the control portion 20 feeds the medium P to the processing tray 42 by the feeding roller 46 (step S201), and switches the guide member 36 from the separation state (the solid line in FIG. 2) to the guide state (the two-dot chain line and the reference sign 36-2 in FIG. 2) (step S202).

Then, the control portion 20 performs the rear end alignment processing (step S203), and further performs the side end alignment processing (step S204). As described above, the rear end alignment processing is processing of causing the rear end Pe of the medium P to abut against the rear end aligning portion 39 by the pulling-back portion 44. Further, the side end alignment processing is processing of aligning a side end of the medium P by the side cursor 58 as described above.

Next, the control portion 20 switches the guide member 36 from the guide state (the two-dot chain line and the reference sign 36-2 in FIG. 2) to the separation state (the solid line in FIG. 2) (Step S205).

Then, when a next page is stacked on the processing tray 42 (Yes in step S206), step S201 and the subsequent steps are performed again.

When the next page is not stacked on the processing tray 42 (No in Step S206) and the processing (binding processing) by the stapler 34 is performed (Yes in Step S207), the processing (binding processing) by the stapler 34 is performed (Step S208).

When the processing (binding processing) by the stapler 34 is not performed (No in Step S207) or when the processing (binding processing) by the stapler 34 is completed (Step S208), the movable portion 43 is switched from the retraction state (state of FIG. 2) to the advancement state (state of FIG. 3), that is, the discharge driven roller 67 is switched from the second state (state of FIG. 2) to the first state (state of FIG. 3) (Step S209). That is, the discharge driven roller 67 is switched from the second state to the first state.

As a result, the discharge roller pair 65 can discharge the medium P or the medium bundle Pt, thus the discharge driving roller 66 is driven to discharge the medium P or the medium bundle Pt to the lower support tray 60 (step S210).

Then, the movable portion 43 is switched from the advancement state (the state of FIG. 3) to the retraction state (the state of FIG. 2), that is, the discharge driven roller 67 is switched from the first state (the state of FIG. 3) to the second state (the state of FIG. 2) (step S211). That is, the discharge driven roller 67 is switched from the first state to the second state.

Then, when there is a next job, that is, when the subsequent media P are fed to the processing tray 42 (Yes in step S212), step S201 and the subsequent steps are performed again.

Note that the operation of the lower support tray 60 in the first mode is the operation described with reference to FIG. 4.

Next, the second mode will be described with reference to FIG. 11.

In the second mode, the control portion 20 determines whether a medium width is equal to or greater than a width Wd based on a medium size included in the recording information (step S301). In the example, the width Wd is a disposition interval between the sheet members 52 as illustrated in FIG. 7.

Then, when the medium width is equal to or greater than the width Wd (Yes in Step S301), the guide member 36 is moved in the X-axis direction, that is, in the medium width direction, to be specific, moved to a retracted position set in the medium width direction (Step S302). The retracted position of the guide member 36 is, for example, a position indicated by a two-dot chain line and a reference sign 36-5 in FIG. 7.

When the medium width is less than the width Wd (No in step S301), the guide member 36 remains at a position indicated by a solid line in FIG. 7. Note that the position of the guide member 36 indicated by the solid line in FIG. 7 is a home position of the guide member 36, and the guide member 36 is normally located at the home position.

Here, the disposition of the guide member 36 based on the medium width will be described with reference to FIGS. 5 and 6. As described above, the curvature along the medium width direction is imparted to the medium P by the curvature imparting portion 50. In FIG. 6, a reference sign Pu indicates a bulging portion that bulges upward as a result of being imparted with the curvature. FIG. 6 illustrates a cross section of the guide member 36 and the guide member 36 is located at the home position. When the bulging portion Pu is formed in the medium P by the curvature imparting portion 50, there is a possibility that the bulging portion Pu is caught by the guide member 36 located at the home position and causes a jam.

In particular, in the second mode, the medium P is fed to the processing tray 42 by the feeding roller 46 while the movable portion 43 is in the advancement state (the state of FIG. 3), the above-described jam is more likely to occur. That is, the guide member 36 indicated by a solid line in FIG. 5 corresponds to the guide member 36 indicated by the solid line in FIG. 2, and is at a position when the movable portion 43 is in the retraction state and the guide member 36 is in the separation state. In addition, in FIG. 5, a two-dot chain line and a reference sign 36-3 indicate a position of the guide member 36 when the movable portion 43 is switched from the above-described state to the advancement state, which corresponds to the guide member 36 indicated by the solid line in FIG. 3. Note that in the second mode, the guide member 36 is maintained in a raised state in the movable portion 43, and the switching between the separation state and the guide state described with reference to FIG. 2 is not performed.

As illustrated in FIG. 5, since an upstream end (end portion in the +Y direction) of the guide member 36 is slightly lowered when the movable portion 43 is switched from the retraction state to the advancement state, a leading end of the medium P is likely to be caught by the guide member 36.

Here, since upward movement is regulated by the sheet material 52, floating of the medium P is suppressed by the sheet material 52 at a position of the sheet material 52 or at a position farther from the center position CL than the sheet material 52 in the width direction. Therefore, when a size of the medium P in the medium width direction is such a size that the medium P comes into contact with the sheet material 52 (Yes in Step S301), the control portion 20 moves the guide member 36 from the home position to the retracted position before feeding the medium P to the processing tray 42 by the feeding roller 46 (Step S302). As a result, it is possible to prevent a floating portion at the leading end of the medium P, that is, the bulging portion Pu from colliding with the guide member 36 and causing a jam.

Note that it is sufficient that the retracted position of the guide member 36 is a position overlapping the sheet material 52 or a position farther from the center position CL than the sheet material 52. The fact that the guide member 36 overlaps the sheet material 52 in the medium width direction means that at least a part of the guide member 36 and at least a part of the sheet material 52 are located at the same position in the medium width direction. However, it is more suitable that a part of the guide member 36 does not fall within a range of the medium width Wd.

Next, the control portion 20 switches the movable portion 43 from the retraction state (state of FIG. 2) to the advancement state (state of FIG. 3), that is, switches the discharge driven roller 67 from the second state (state of FIG. 2) to the first state (state of FIG. 3) (Step S303).

Then, in this state, while the medium P is fed to the processing tray 42 by the feeding roller 46, the discharge driving roller 66 is driven to discharge the medium P to the main tray 33 (Step S304).

Note that in the second mode, the side cursor 58 is maintained in a state of being disposed further outside the medium width of a maximum size, and the side end of the medium P fed to the processing tray 42 does not come into contact with the side cursor 58. In addition, in the second mode, the lower support tray 60 is maintained in an open state, and even the medium P having the maximum medium width does not come into contact with the lower support tray 60 and drops onto the main tray 33 as is.

Next, when there is a next page (Yes in step S305), the control portion 20 determines whether the number of discharged sheets exceeds a predetermined number when the next page is discharged (step S306). The number of discharged sheets here is a cumulative number of discharged sheets, and the cumulative number of discharged sheets means a total number of sheets of the media P discharged to the main tray 33 by the second mode from the start of step S101 in FIG. 9. Information about the predetermined number of sheets in step S306 is stored in a non-volatile memory (not illustrated) included in the control portion 20.

In a case where the number of discharged sheets exceeds the predetermined number when the next page is discharged (Yes in Step S306), the control portion 20 switches the mode to perform from the second mode to the first mode (Step S307).

This is because when the number of discharged media P exceeds the predetermined number and the medium P is subsequently discharged by the second mode as is, there is a possibility that the stacking state may be disturbed at the discharge destination (the main tray 33 in the embodiment) of the medium P by the discharge roller pair 65.

In view of such a problem, in a case where the second mode is selected, when the number of discharged media P exceeds the predetermined number, the control portion 20 cancels the second mode and performs the first mode. Since the rear end alignment processing and the side end alignment processing are performed in the first mode, it is possible to suppress disturbance of the stacking state at the discharge destination of the medium P by the discharge roller pair 65. Further, when the medium P is a medium on which ink is discharged, since the rear end alignment processing and the side end alignment processing are performed in the first mode, it takes time for the medium P to reach the discharge destination, thus, drying of the ink progresses during the time, and it is possible to suppress a situation in which the stacking state is disturbed at the discharge destination.

Then, the control portion 20 switches the movable portion 43 from the advancement state (the state of FIG. 3) to the retraction state (the state of FIG. 2), that is, switches the discharge driven roller 67 from the first state (the state of FIG. 3) to the second state (the state of FIG. 2) (step S308).

In a case where the number of discharged sheets (cumulative number of discharged sheets) does not exceed the predetermined number, when the next page is discharged (No in step S306), step S304 and the subsequent steps are performed again.

When there is no next page (No in step S305), the processing proceeds to step S308.

As described above, the control portion 20 can perform the first mode and the second mode, and when performing the first mode, can place the medium P on the processing tray 42 to obtain a state where processing by the stapler 34 is possible. In addition, when the control portion 20 performs the second mode, the medium P fed to the processing tray 42 by the feeding roller 46 is not placed on the processing tray 42 in order to be processed by the stapler 34, and discharged as is. As described above, it is possible to meet the user's need to discharge the medium P as is without being processed by the stapler 34.

In addition, in the first mode, the advancement and retraction operation of the movable portion 43 intervenes each time the medium P or the medium bundle Pt is discharged by the discharge roller pair 65, whereas in the second mode, the movable portion 43 does not perform the advancement and retraction operation each time the medium P is discharged and the advancement state of the movable portion 43 is maintained, thus, it is possible to suppress an operation sound and to provide an apparatus with a quiet operation sound.

In addition, in the first mode, after the medium P is fed to the processing tray 42, the rear end alignment processing and the side end alignment processing are performed, and in the second mode, the rear end alignment processing and the side end alignment processing are not performed, thus it is possible to further suppress the operation sound of the apparatus.

Note that a medium feeding speed by the feeding roller 46 and the discharge roller pair 65 in the second mode may be set to be equal to a medium feeding speed by the feeding roller 46 in the first mode, or the medium feeding speed by the feeding roller 46 and the discharge roller pair 65 in the second mode may be set to be lower than the medium feeding speed by the feeding roller 46 in the first mode. By setting the medium feeding speed by the feeding roller 46 and the discharge roller pair 65 in the second mode to be lower than the medium feeding speed by the feeding roller 46 in the first mode, it is possible to suppress a stacking disturbance at the discharge destination by the discharge roller pair 65 when the medium P is discharged by the second mode in which the rear end alignment processing and the side end alignment processing are not performed.

The present disclosure is not intended to be limited to the aforementioned exemplary embodiments, and many variations are possible within the scope of the present disclosure as described in the appended claims. It goes without saying that such variations also fall within the scope of the present disclosure.

What is claimed is:

1. A medium processing apparatus, comprising:

a feeding portion configured to transport a medium;

a processing tray on which the medium transported by the feeding portion is placeable;

a curvature imparting portion configured to impart a curvature along a width direction to the medium fed to the processing tray, wherein the curvature imparting portion includes a roller that comes into contact with a first surface of the medium;

a processing portion configured to process the medium on the processing tray; and a discharging portion configured to discharge the medium placed on the processing tray, wherein a first mode in which the medium transported by the feeding portion is placed on the processing tray and then discharged by the discharging portion, and a second mode in which the medium transported by the feeding portion is discharged by the discharging portion without being placed on the processing tray are switchable.

2. The medium processing apparatus according to claim 1, further comprising an aligning portion configured to align the medium placed on the processing tray, wherein in the first mode, alignment of the medium by the aligning portion is performed, and in the second mode, the alignment of the medium by the aligning portion is not performed.

3. The medium processing apparatus according to claim 1, wherein the discharging portion includes a discharge roller pair, in the first mode, after the medium is placed on the processing tray in a state where the discharge roller pair does not form a nip, the medium is discharged in a state where the discharge roller pair forms the nip, and in the second mode, the medium is discharged by the feeding portion and the discharge roller pair, while the state where the discharge roller pair forms the nip is maintained.

4. A recording system, comprising:

a recording apparatus including a recording portion that performs recording on a medium; and the medium processing apparatus according to claim 1 configured to perform processing on the medium on which the recording is performed by the recording apparatus.

5. A medium processing apparatus, comprising:

a processing portion configured to perform processing on a medium;

a processing tray on which the medium subjected to the processing is placed;

a feeding roller configured to feed the medium to the processing tray; and a discharge roller pair configured to discharge the medium from the processing tray, wherein the discharge roller pair includes a first roller that comes into contact with a first surface as a surface where the medium comes into contact with the processing tray; and a second roller that is a roller that comes into contact with a second surface opposite to the first surface of the medium, and that is switchable between a first state of being configured to nip, together with the first roller, the medium, and a second state of being farther from the first roller than in the first state, and a control portion that controls state switching of the second roller is configured to switch between a first mode in which the medium is fed to and placed on the processing tray by the feeding roller while the second roller is in the second state, the second roller is switched from the second state to the first state, and the medium placed on the processing tray is discharged by the discharge roller pair, and a second mode in which the medium is discharged by the feeding roller and the discharge roller pair without being placed on the processing tray while the first state of the second roller is maintained.

6. The medium processing apparatus according to claim 5, comprising:

a rear end aligning portion configured to align a rear end in a transport direction of the medium placed on the processing tray; and a side end aligning portion configured to align a side end in a width direction intersecting the transport direction of the medium placed on the processing tray, wherein in the first mode, after the medium is fed to the processing tray, the alignment of the rear end by the rear end aligning portion and the alignment of the side end by the side end aligning portion are performed, and in the second mode, the alignment of the rear end by the rear end aligning portion and the alignment of the side end by the side end aligning portion are not performed.

7. The medium processing apparatus according to claim 6, comprising a movable portion being a portion including the second roller, and configured to switch between an advancement state to bring the second roller into the first state and a retraction state to bring the second roller into the second state, wherein the movable portion includes a guide member being a member disposed at a position facing the processing tray, and configured to switch between a guiding state to guide the medium to the rear end aligning portion when the movable portion is in the retraction state, and a separation state to be farther from the processing tray than in the guide state.

8. The medium processing apparatus according to claim 7, comprising a curvature imparting portion configured to impart a curvature along the width direction to the medium fed to the processing tray by the feeding roller.

9. The medium processing apparatus according to claim 8, wherein the curvature imparting portion includes a driven roller that comes into contact with the first surface of the medium and is driven to rotate, and a sheet material that is a sheet that comes into contact with the second surface of the medium and is disposed at a position shifted from the driven roller in the width direction.

10. The medium processing apparatus according to claim 9, wherein the driven roller and the sheet material are located on either side of a center position of the medium in the width direction, the sheet material is located at a position farther from the center position than the driven roller, the guide member is provided on either side of the center position in the width direction, in addition, the guide member is movable along the width direction under the control of the control portion, and the control portion disposes the guide member at a position overlapping the sheet material or at a position farther from the center position than the sheet material before feeding the medium to the processing tray by the feeding roller when a size of the medium in the width direction is such that the medium comes into contact with the sheet material.

11. The medium processing apparatus according to claim 6, wherein in a case where the second mode is selected, when a recording duty of the medium exceeds a predetermined threshold value, the control portion cancels the second mode and performs the first mode.

12. The medium processing apparatus according to claim 6, wherein in a case where the second mode is selected, when a number of discharged media exceeds a predetermined number, the control portion cancels the second mode and performs the first mode.

13. The medium processing apparatus according to claim 5, wherein the first mode and the second mode are selectable via an operation portion for performing various operations.

14. A recording system, comprising:

a recording apparatus including a recording portion that performs recording on a medium; and the medium processing apparatus according to claim 5 configured to perform processing on the medium on which the recording is performed by the recording apparatus.

15. The recording system according to claim 14, wherein the recording portion performs the recording by ejecting liquid onto the medium.

16. A method of controlling a medium processing apparatus including a feeding portion that transports a medium, a processing tray on which the medium transported by the feeding portion is placeable, a curvature imparting portion configured to impart a curvature along a width direction to the medium fed to the processing tray, wherein the curvature imparting portion includes a roller that comes into contact with a first surface of the medium, a processing portion configured to process the medium on the processing tray, and a discharging portion configured to discharge the medium placed on the processing tray, the method comprising a procedure for selecting one of a first mode or a second mode, wherein the first mode is a mode in which the medium transported by the feeding portion is placed on the processing tray and then discharged by the discharging portion, and the second mode is a mode in which the medium transported by the feeding portion is discharged by the discharging portion without being placed on the processing tray.

* * * * *